Figure 1:
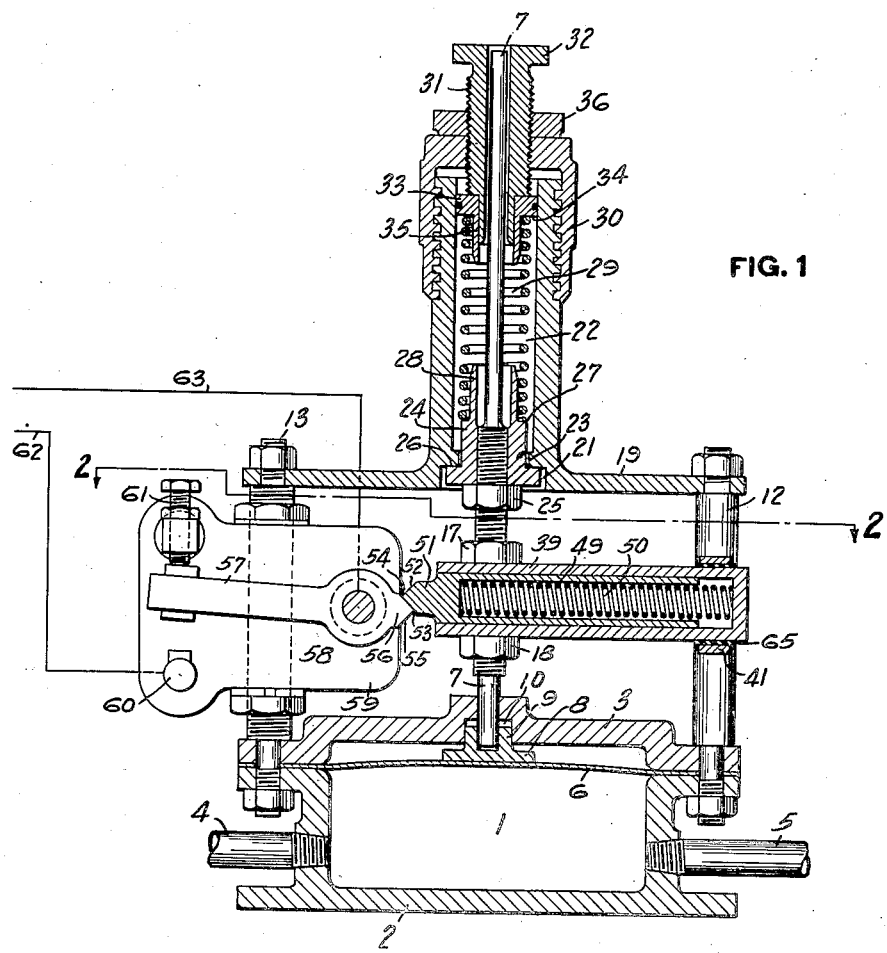

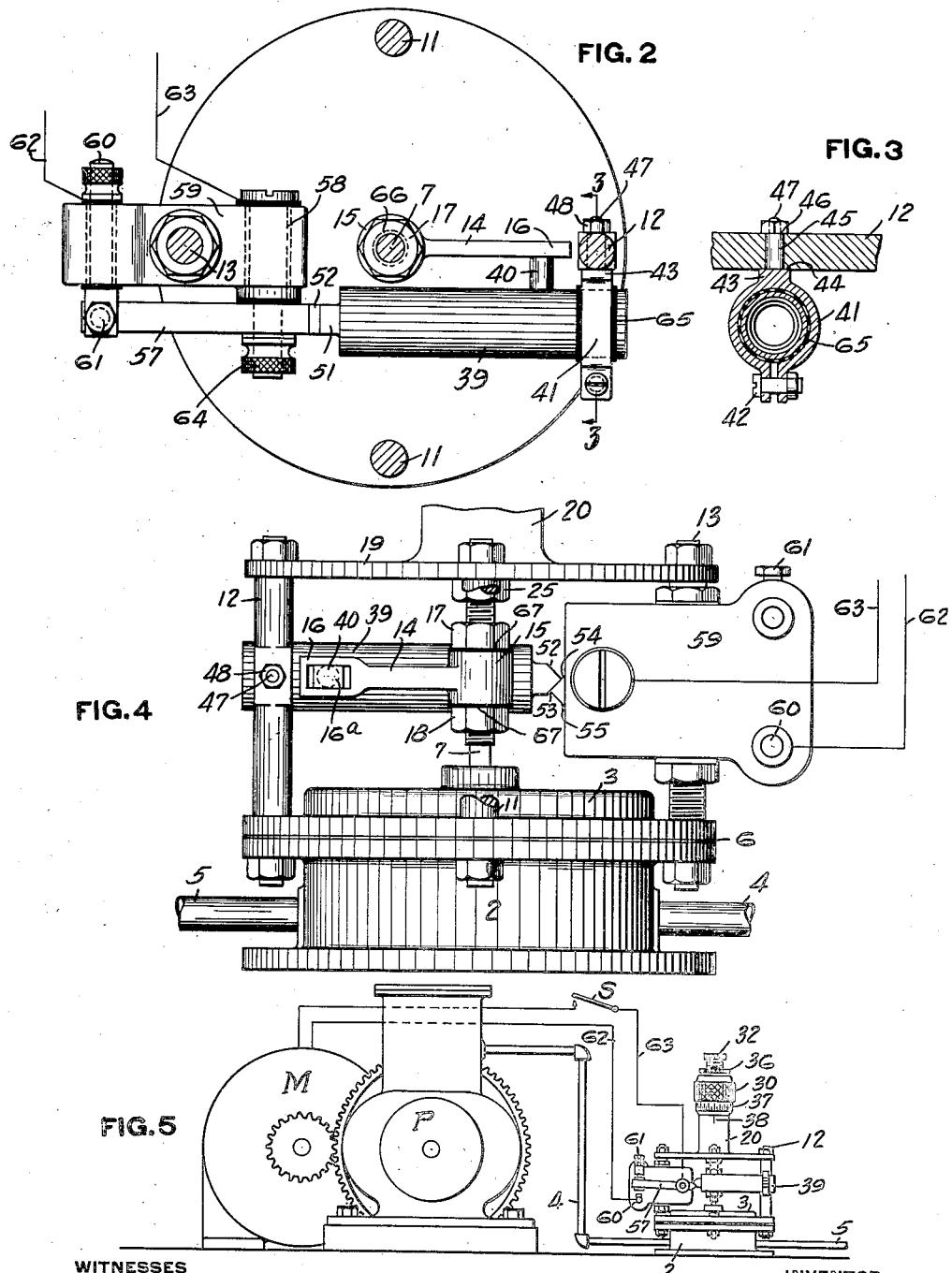

UNITED STATES PATENT OFFICE.

ELMER E. DAVIS, OF BUTLER, PENNSYLVANIA, ASSIGNOR TO THE UNION ENGINE AND MANUFACTURING COMPANY, OF BUTLER, PENNSYLVANIA, A CORPORATION OF PENNSYLVANIA.

PRESSURE-REGULATOR AND MOTOR CUT-OUT.

1,245,200.   Specification of Letters Patent.   Patented Nov. 6, 1917.

Application filed June 24, 1916. Serial No. 105,612.

*To all whom it may concern:*

Be it known that I, ELMER E. DAVIS, a resident of Butler, in the county of Butler and State of Pennsylvania, have invented a new and useful Improvement in Pressure-Regulators and Motor Cut-Outs, of which the following is a specification.

This invention relates to pressure regulators for any kind of fluid. The object of the invention is to provide means for controlling the fluid supply, so that it may be operated intermittently, to maintain the pressure constant, or within fixed limits. A further object is to provide such a device with a diaphragm exposed to fluid pressure so made that the diaphragm may be constructed of metal. A further object is to provide means for magnifying the movement of the diaphragm in translation of such movement to a controlling device in the fluid supply. A further object is to provide means for accurately adjusting the pressure against the diaphragm on the side opposite that exposed to the fluid pressure, and means for varying such adjustment, and calibrations by which the adjustment may be made to correspond to certain definite measurements as for example, so many pounds per square inch. A further object is to provide an electric switch, controlling a motor circuit, which will be operated by movement of the diaphragm, and further, to provide means operated by movement of the diaphragm to open and close the switch by a trip action, and further to provide means for regulating the amount of travel of the switch arm.

These objects, and other advantages which will be apparent to those familiar with this art, are attained by a structure the preferred form of which is illustrated in the accompanying drawings. Figure 1 is a central vertical section; Fig. 2 is a plan on the line 2—2 of Fig. 1, the top portions being removed; Fig. 3 is a partial vertical section on the lines 3—3 of Fig. 2; Fig. 4 is a rear elevation of the part shown in Fig. 2; and Fig. 5 is a diagram of a system including the pressure regulator as an element.

It is not new to regulate a supply of fluid pressure by exposing a diaphragm to the fluid, and having a stem actuated by the diaphragm controlling the supply motor. However, there is difficulty in such devices in providing a diaphragm which will be sufficiently expansible to allow a considerable movement, and at the same time be strong enough to stand the high strains to which it is subjected, and durable enough to stand the corrosive action of fluids to which it is exposed. Rubber and leather have been used but do not last. Metal diaphragms do not ordinarily allow sufficient lateral movement to actuate a switch. I have provided means by which a diaphragm of copper or similar metal, which is non-corrosive and of considerable tensile strength, may be used, and the small lateral movement which can be obtained from such a diaphragm is translated by my construction into a considerably larger movement, for the purpose of actuating a controlling switch.

A chamber 1 is formed by casing members 2 and 3. Fluid is admitted to this chamber by a supply pipe 4 and is drawn off through the pipe 5. The chamber is divided by a diaphragm 6 which is held in position by being clamped across the chamber and between the casing members 2 and 3. A stem 7 works through the casing, having an enlarged head 8 seated on the diaphragm 6, and having a cylindrical portion 9 working in and guided by a recess 10 in the wall of the casing. The diaphragm is clamped in position and the casing held together by means of tie rods or standards 11, 12 and 13, which extend upward and support all of the movable parts hereinafter described. The stem 7 is enlarged and threaded throughout its middle portion and carries an arm 14, which has a collar 15 around the stem, and which terminates in a closed fork 16, carrying a slidable bearing member 16ª therein. Nuts 17 and 18 are provided to rigidly clamp this fork member in position as clearly shown in Fig. 4. The tie rods 11, 12 and 13 carry at their top a casting 19 which has a central upwardly extending cylinder 20 which has a bore 21 and a smaller bore 22, separated by a shoulder 23, and which is externally threaded at its outer end. The stem 7 carries a threaded sleeve 24 which is locked by nut 25, and which has a shoulder 26 engaging the shoulder 23 of the casting. The sleeve 24 extends into the bore 22 and has a shoulder 27 and a neck 28 adapted to form a seat for coiled spring 29 which is carried in the bore 22 and surrounds the stem 7. It will be understood that sleeve 24 is merely a guide for the stem 7, and that the shoulder 26 is designed to coöperate with shoulder 23, to limit the upward travel of the stem 7, and to prevent excessive strain on the diaphragm 6. A threaded cap 30 screws on the end of the cylinder 20, and through the center of this cap is threaded a hollow sleeve 31, having a knurled handhold 32. This sleeve surrounds the outer end of the stem 7, as shown. On its inner end it engages a follower 33 which is slidably mounted in the bore 22, and has a shoulder 34 and a neck 35 adapted to seat and hold the coiled spring 29. A nut 36 is provided for locking the sleeve 32 in fixed relation to the cap 30. This cap is formed with an enlarged knurled band around it, and has parallel axial calibrations 37 around the lower end, coöperating with an indicating mark 38 on the casing 20, as shown in Fig. 5.

A hollow lever 39, having a rigid lateral spur 40, is pivotally mounted on the tie rod 12. This mounting consists of a circular yoke 41 having an open end governed by a set screw 42, and adapted to clamp and provide a fulcrum for the lever 39. An extension 43 has a shoulder 44 and a cylindrical journal 45 adapted to work through the tie rod 12, and having a shoulder 46 beyond said bolt, with a threaded extension 47 and a nut 48 thereon. By this means the lever 39 is securely, but adjustably clamped by the yoke, which is in turn journaled in the bolt 12, all as clearly shown in Figs. 2 and 3. Inside the lever 39, is a hollow plunger 49, bearing against a coiled spring 50 carried in the plunger and tending to force the plunger outward. The plunger has a nose 51 with two oppositely beveled faces 52 and 53, one of which bears against one of the beveled faces 54 or 55 of the nose 56 of a switch arm 57, which is pivotally mounted by the bolt 58 to an insulating plate 59, which in turn is fixed on the tie rod 13 passing therethrough. The insulating plate carries a contact post 60 and an adjustable set screw 61, which is adapted to limit the travel of the switch arm away from the contact post 60. One conductor wire 62 of an electric circuit is connected to the contact post 60, and the other conductor wire 63 of the circuit to the switch arm through its mounting bolt 58, which has a binding screw head 64.

The lever member 39 is insulated from the main structure by a sleeve 65 of suitable material under the yoke 41, and by an insulating packing 66 inside the collar 15 and insulating washers 67 under nuts 17 and 18. This prevents any grounding or short circuiting through the framework of the structure.

The operation of the device is as follows:—Fluid being admitted to the chamber 1, pressure is exerted to force the diaphragm upward, thus raising the shaft 7 upon which is rigidly carried the fork member 14, which engages the pin 40 in the hollow lever 39. It will be observed that the pin 40 is between the fulcrum 41 and the middle point of the lever. Consequently movement of the fork 14 applied to the lever raises its free end, and because of the position of the pin 40 the movement is magnified several times. Thus a very small movement of the diaphragm will cause a considerable movement of the free end of the lever 39. The beveled nose of the plunger and the beveled nose of the switch arm are in alinement, and are pressed together by the spring 50. In Fig. 1 the device is shown with the diaphragm raised, indicating full pressure in the chamber 1, and the switch is open. The beveled faces 53 of the plunger and 54 of the switch arm are pressed together and their tendency is to keep the switch in the position indicated. As the pressure of fluid in the chamber falls the diaphragm will be withdrawn, the stem 7 seated thereon will be forced downward by the spring 29, and the free end of the lever 39 will be lowered. Downward movement of the beveled face 53 will slide the plunger back into its casing against pressure of spring 50 until the edge of the plunger nose passes the edge of the switch nose. This opposes the beveled faces 52 and 55, and the spring 50 will force the plunger outward, quickly throwing the beveled nose of the switch upward, and bringing the arm into engagement with the contact 60, completing the electric circuit in obvious manner. By varying the screw 61, the amount of travel of the switch arm is adjustable. This determines the limits of variation necessary to operate the switch, as will be obvious. By allowing a very small travel of the switch arm, the diaphragm will throw the switch on very slight movement. In other words, the device will start and stop when the pressure falls or rises a relatively small amount.

The circuit extends to a motor M, which is geared to any suitable form of pump

P, which has a supply pipe 4 in which is connected the regulating device above described. It will be understood that the circuit is also broken by a manually operated switch S which is thrown out of engagement when the system is not in operation. By this means, when the fluid pressure rises to a predetermined limit, the switch 57 will be thrown to break the circuit and shut off the supply. As the pressure falls below a certain limit the switch will be again thrown to start the motor and additional fluid will be pumped through the chamber and to the point of use so long as the pressure remains lower than the fixed limit.

By varying the force of the spring 29 which is opposed to outward movement of the diaphragm, the regulator may be set to operate the switch at any desired limits of pressure. By loosening the locking nuts 36 the threaded sleeve 31 may be used to vary the force of spring 29, which will vary the fluid pressure in the chamber 1 necessary to raise the diaphragm. When proper limits of pressure desired have been determined and the sleeve 31 adjusted thereto, it is locked in position. After that, in case it is desirable to make very fine adjustments, the cap 30 may be rotated, which raises and lowers the abutment of spring 29, as will be obvious. By having the outer periphery of this cap calibrated, with a zero mark on the casing 20, by using only a part of the turn of the cap, a micrometer adjustment is possible. By this means the regulator may be set so that the switch will operate within very fine limits of variation in pressure. In certain cases, such as supplying air to blow up pneumatic tires, it may be desirable to know exactly the number of pounds supplied. In such cases the calibrations on the cap 30 will be very useful, and by the adjustments above described the regulator may be set so that the exact pressure desired may be obtained in any particular case, and this may be readily varied to suit changing needs, the amount of pressure supplied in each particular case being indicated exactly by numbering the calibrations.

The positive action of the device, the durability of parts, the fineness of adjustment, and the simplicity of construction are all unusual, and can not be obtained in the ordinary form of pressure regulators.

I claim:—

1. A fluid pressure regulator comprising a chamber connected to a fluid supply and closed by a diaphragm, a stem reciprocated by movement of the diaphragm, a laterally extending fork fixed on the stem, a lever pivotally mounted at one end and having a laterally extending spur engaged by the fork, a spring pressing the stem against the diaphragm, means to vary the pressure of the spring and calibrations to indicate the amount of such variation, a switch actuated by the free end of the lever, and an electrically operated fluid supply device controlled by the switch.

2. A fluid pressure regulator comprising a chamber connected to a fluid supply and closed by a diaphragm, a stem reciprocated by movement of the diaphragm, a laterally extending fork fixed on the stem, a lever pivotally mounted at one end and having a laterally extending spur between its fulcrum and middle point engaged by the fork, a spring pressing the stem against the diaphragm, means to vary the pressure of the spring and calibrations to indicate the amount of such variation, a switch actuated by the free end of the lever, and an electrically operated fluid supply device controlled by the switch.

3. A fluid pressure regulator comprising a chamber connected to a fluid supply and closed by a diaphragm, a stem reciprocated by movement of the diaphragm, a spring pressing the stem against the diaphragm, a threaded terminal for the spring adapted to vary the pressure of the stem on the diaphragm, and a second threaded member having micrometer calibrations, to further adjust said pressure, a switch opened and closed by movement of the stem, and an electrically operated fluid supply device controlled by the switch.

4. A fluid pressure regulator comprising a chamber connected to a fluid supply and closed by a diaphragm, a stem reciprocated by movement of the diaphragm, a laterally extending fork fixed on the stem, a hollow lever pivotally mounted at one end and having a laterally extending spur engaged by said fork, a spring in the lever, a plunger seated on the spring and having a beveled nose engaging a switch arm having a beveled nose alined with the plunger whereby to throw the switch by lateral movement of the plunger, and an electrically operated fluid supply device controlled by the switch.

5. A fluid pressure regulator comprising a chamber connected to a fluid supply and closed by a diaphragm, a beveled nosed switch arm controlling an electric circuit, a stem reciprocated by movement of the diaphragm, a spring pressing the stem against the diaphragm, a pivotally mounted sleeve connected to the stem, a plunger therein having a beveled nose alined with the beveled nose of the switch arm, a spring in the sleeve behind the plunger to allow the plunger to move in and out to bear alternately against the beveled faces of the switch arm as the sleeve is moved on its pivot by the stem to open and close the switch, and an electrically operated fluid supply device controlled by the switch.

6. A fluid pressure regulator comprising a chamber connected to a fluid supply and closed by a diaphragm, a stem reciprocated by movement of the diaphragm, a rigid laterally extending arm carried by said stem, a lever pivotally mounted at one end and operatively connected to said arm at a point between its fulcrum and middle point, a switch actuated by a beveled nose at the end of said lever, and an electrically operated fluid supply device controlled by the switch.

In testimony whereof, I have hereunto set my hand.

ELMER E. DAVIS.

Witnesses:
M. R. SHANER,
HARRY L. GRAHAM.